United States Patent [19]

Cwirzen et al.

[11] Patent Number: 4,613,732

[45] Date of Patent: Sep. 23, 1986

[54] INTERFACE MODULE WITH MODULAR JACK FOR TELECOMMUNICATIONS SYSTEMS

[75] Inventors: Casimir Cwirzen, Arlington Heights; Donald F. Jaycox, Deerfield, both of Ill.

[73] Assignee: Northern Telecom Limited, Montreal, Canada

[21] Appl. No.: 630,880

[22] Filed: Jul. 13, 1984

Related U.S. Application Data

[63] Continuation-in-part of Ser. No. 544,970, Oct. 24, 1983, abandoned.

[51] Int. Cl.$^4$ .............................................. H02H 1/00
[52] U.S. Cl. ..................................... 179/178; 361/119
[58] Field of Search ................ 179/178; 361/119, 299; 339/122 R, 125 R

[56] References Cited

U.S. PATENT DOCUMENTS

| | | | |
|---|---|---|---|
| 4,217,154 | 2/1982 | Passarella | 361/119 |
| 4,220,391 | 9/1980 | Krolak | 339/126 R |
| 4,274,691 | 6/1981 | Abernathy | 339/19 |
| 4,296,991 | 10/1981 | Hughes | 339/176 MP |
| 4,303,296 | 12/1981 | Spaulding | 339/126 R |
| 4,343,527 | 8/1982 | Harrington | 339/125 R |
| 4,402,031 | 8/1983 | Fasano | 361/119 |
| 4,408,819 | 10/1983 | Guelden | 339/154 A |
| 4,411,485 | 10/1983 | Wisehart | 339/125 R |

Primary Examiner—Gene Z. Rubinson
Assistant Examiner—L. C. Schroeder
Attorney, Agent, or Firm—Schwartz, Jeffery, Schwaab, Mack, Blumenthal & Evans

[57] ABSTRACT

An interface for use with telecommunications systems, at a customers premises, comprises a module for connection to the incoming telephone lines and having a modular jack for plugging in of the customers lines. Conveniently the module is a plug-in arrangement, and incorporates line protectors. Back-up protectors can also be provided. The module can also connect to, and also incorporate circuits for providing services such as automatic number identification and similar services.

12 Claims, 25 Drawing Figures

INTERFACE MODULE WITH MODULAR JACK FOR TELECOMMUNICATIONS SYSTEMS

CROSS-REFERENCE

This application is a Continuation-in-Part of application Ser. No. 544,970, filed Oct. 24, 1983, now abandoned.

BACKGROUND OF THE INVENTION

1. Field of the invention

This invention relates to an interface module with a modular jack, for use in telecommunications systems. In particular the invention relates to such a module for providing a plug-in connection at the interface between a telephone company line and a customers telephone wiring at their premises.

2. Related Art

With the development of the division between telephone company and customer, the telephone company providing the service to the customers premises and the customer being responsible for the telephone wiring on their premises, and apparatus connected thereto, it has been decided that an interface or demarcation be provided between telephone company lines and customers wiring. It has also been decided that a plug-in facility at such interface be provided.

SUMMARY OF THE INVENTION

The present invention provides a module at which telephone companies lines are terminated and providing a modular jack for connection of the customers telephone wiring. A particular feature of the invention is the provision of overload protection in the module. A further feature is the provision for further services to be supplied at the module.

In its broadest aspect, the invention provides an interface module comprising a main body portion having terminals for connecting incoming telephone lines thereto, and a modular jack connected to the terminals.

In a particular form of the invention the modular jack is integral with the main body portion and a feature of the invention is the provision of overload protection in the main body. The module, in one form, can be plugged into a termination housing. Service functions, such as automatic number identification (ANI), remote isolating device (RID), ringer isolation (RI), load simulator (LS) and other functions can be provided within a module.

BRIEF DESCRIPTION OF THE DRAWINGS

The invention will be readily understood by the following description of various embodiments, by way of example, in conjunction with the accompanying drawings, in which.

DETAILED DESCRIPTION OF THE PREFERRED EMBODIMENTS

Figure 1:
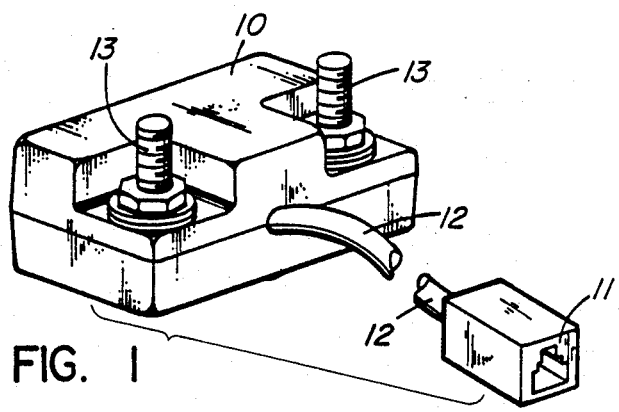
FIG. 1 is a perspective view of a module with stud connection for the telephone lines and a modular jack on a cable.
Figure 2:
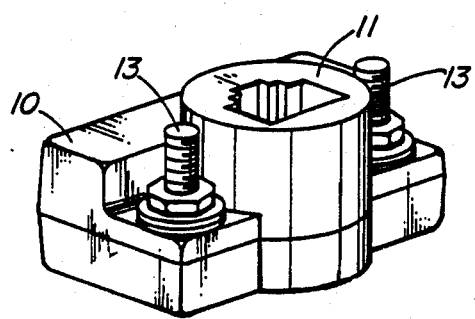
FIG. 2 is a perspective view of a module with stud connectors but with an integral modular jack.
Figure 3:
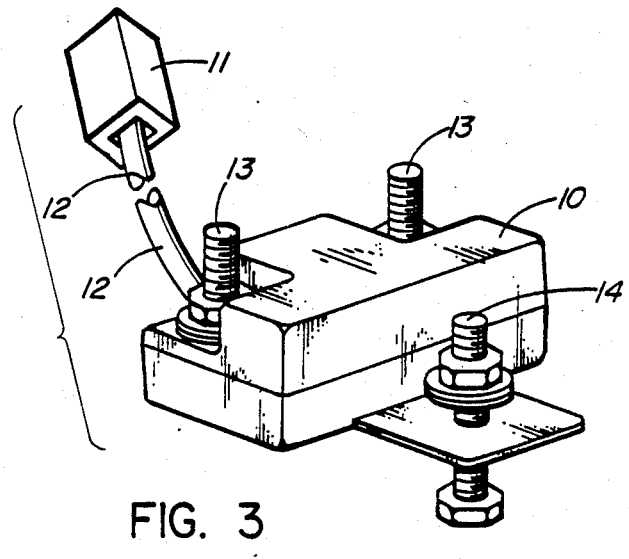
FIG. 3 is a perspective view on the back of the module illustrated in FIG. 1.

FIGS. 1 and 2 illustrate two forms of module, FIG. 1 being a module having a main housing 10 and a modular jack 11 attached thereto by a short length of cable 12. In FIG. 2 the housing 10 has the jack 11 integral therewith. Incoming lines are connected to the housing by the stud terminals 13, there being internal wiring between the studs 13 and the jacks. FIG. 3 is a view of the back of a housing, in the example of the module of FIG. 1. This Figure illustrates the ground terminal 14. This arrangement would also be for the module as in FIG. 2. The modules of FIGS. 1 to 3 are surface mounted, for example by screws through the base of the housing, or by the ground screw 14.

Figure 4:
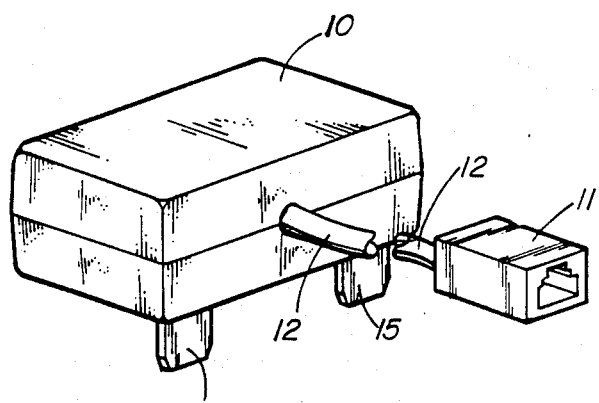
FIGS. 4, 5 and 6 are perspective views of modules, corresponding to those of FIGS. 1 to 3 respectively, but for plug-in modules.
Figure 5:
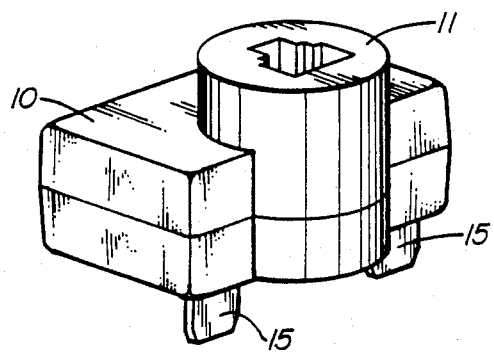
Figure 6:
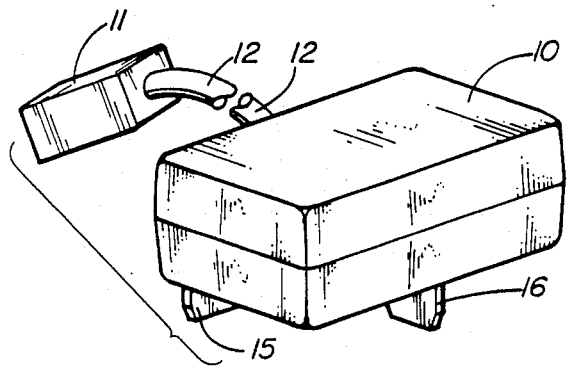

FIGS. 4, 5 and 6 illustrate plug-in forms of modules. In FIG. 4 the housing 10 has a modular jack 11 at the end of short cable 12. In this example connection to incoming lines is by plugging in the module to a base member by means of terminals 15. The terminals also act to mount the module. FIG. 5 has the jack 11 integral with the housing and FIG. 6 illustrates the ground terminal 16. While FIG. 6 illustrates a module of the form of FIG. 4, the ground terminal arrangement 16 would be the same for FIG. 5.

Figure 7:
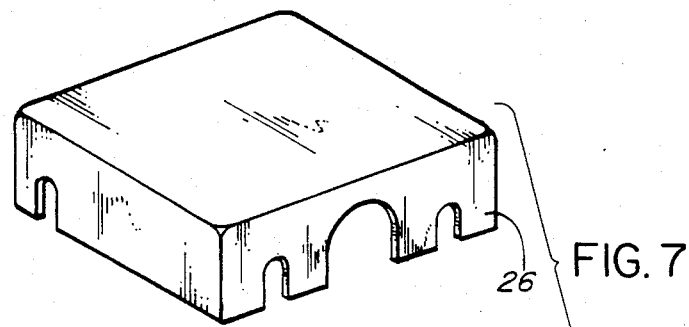
FIG. 7 is an exploded perspective view of a module with a threaded coupling associated with an integral modular plug.

FIG. 7 illustrates one form of module particularly suited for outdoor mounting. The module has a base 20 which can be mounted on a support surface by screws 21. Screw terminals 22 provide for connection of the incoming lines and terminal 23 is a ground terminal. A jack 24 is formed integrally with the base, the jack having a threaded cylindrical periphery 25. A cover 26 fits over the base 20. In use a modular plug 27 is inserted into the jack 24, the cord 28 from the plug 27 passing through an internally threaded cap 29 which screws onto the periphery 25 of jack 24. An elastomeric seal member inside the cap provides a weatherproof seal when the cap is screwed onto the jack.

Figure 8:
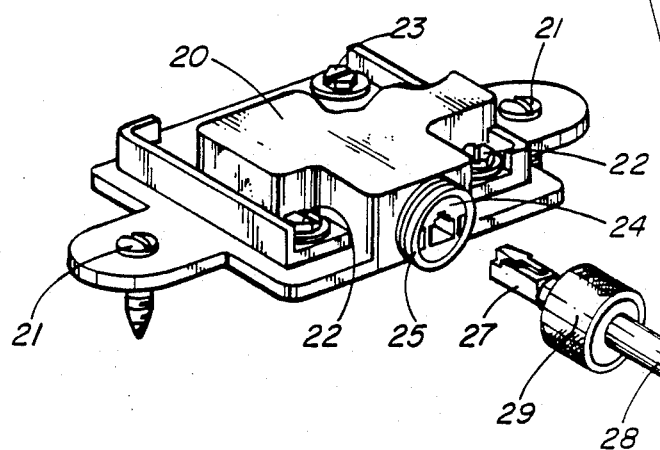
FIG. 8 is a perspective view of a module with integral modular jack and provision for connection to a further service.
Figure 8:
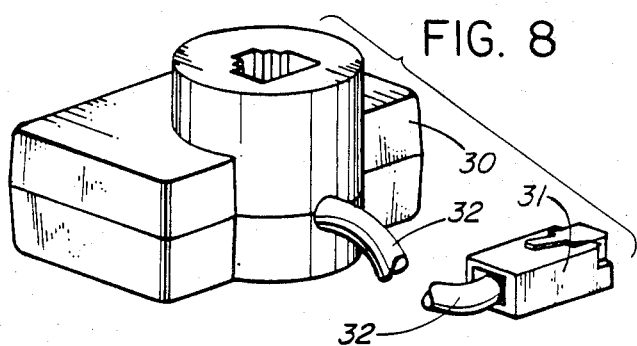
Figure 8A:
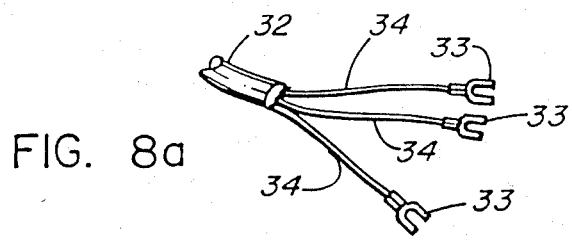
FIG. 8(a) illustrates alternative connection means for the module of FIG. 8.

FIG. 8 illustrates a module 30 housing a special service or function such as illustrated in FIGS. 9(a) to 9(d), with integral jack and also having a modular plug 31 connected thereto by a cable 32. In a modification, FIG. 8(a), instead of the plug 31, the cable 32 can have spade terminals 33 attached to its conductors 34. A particular use of the plug 31 or spade terminals 33 is for the connection of module 30 to a protector module (previously mentioned, or any other manufacturers device). An example of services and functions is: Automatic Number Identification (ANI), Remote Isolating Device (RID), Ringer Isolator (RI), and Load Simulator (LS).

Figure 9A:
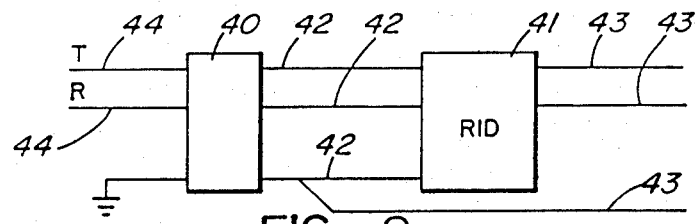
FIGS. 9(a) to 9(d) illustrate diagrammatically the connection of other services and functions to the module, as illustrated in FIG. 8.
Figure 9B:
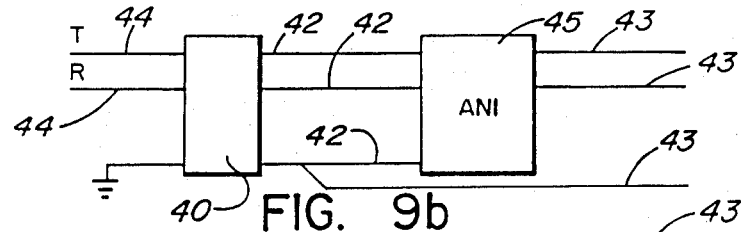
Figure 9C:
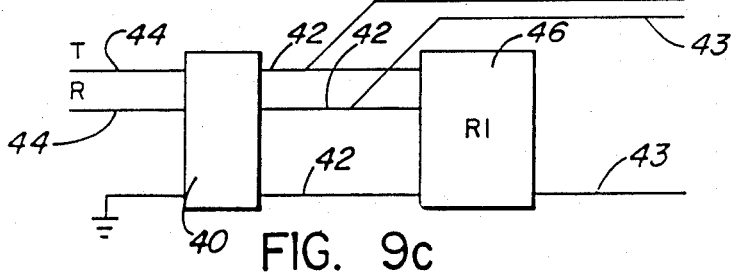
Figure 9D:
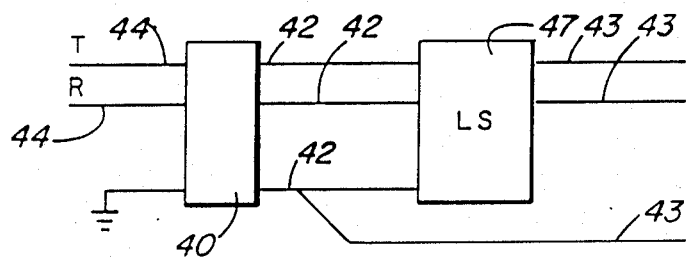

FIGS. 9(a) to 9(d) illustrate diagrammatically the above four arrangements of module and service or function. In all four, the module is indicated at 40. In FIG. 9(a) an RID is indicated at 41, connected to the module 40 by connections 42, with outgoing connection to the customers equipment via connections 43. The incoming lines are indicated at 44. In FIG. 9(b) an ANI 45 is provided, while in FIG. 9(c) there is an RI 46 and in FIG. 9(d) there is an LS 47. Other forms of service and function devices can be provided. The connections 42 can be made by a modular jack and plug arrangement, for example as in FIG. 8, the service device 41, 45, 46 and 47, being provided with a modular jack into which the modular plug 31 fits. Alternatively the spade type connection of FIG. 8(a) can be used. The devices 41, 45, 46 and 47 with modern technology, are quite small and can also be made as an integral part of the module as described later.

It is desirable, and often a requirement that some form of protection against voltage and/or current surges be provided positioned before the connection to the customers equipment and a convenient place for this is in the module. Thus protectors can be provided in the modules of FIGS. 1 to 8 which will provide overvoltage protection, against lightning strikes for example, and also overcurrent protection, if desired, for example against power line contact. Back-up protection can also be provided.

Figure 10:
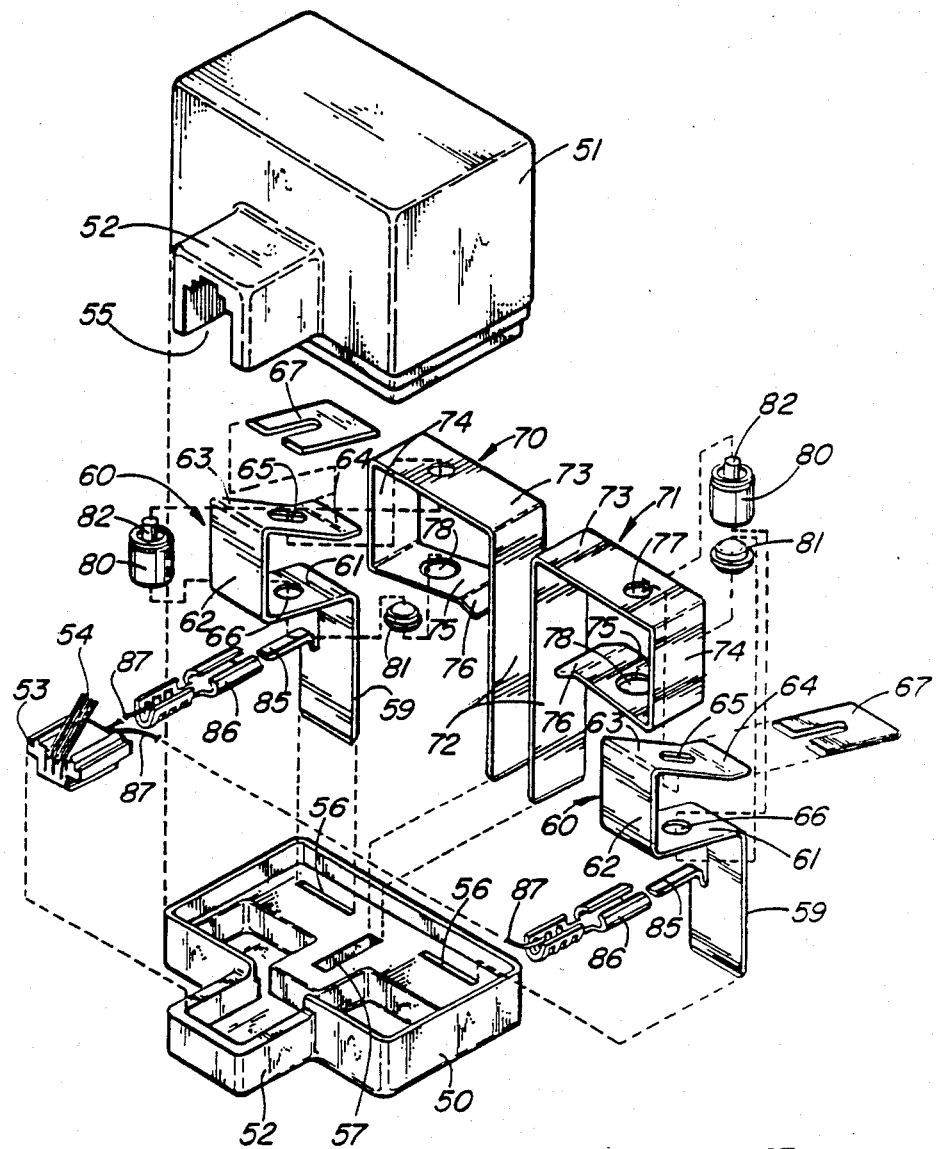
FIG. 10 is an exploded perspective view of one form of plug-in module with line protectors.

FIG. 10 illustrates one form of module having an overload protector for each telephone line, i.e. Tip and Ring, and also a back-up protector for each line. The module of FIG. 10 has a base 50, to which attaches a hollow housing 51. Housing 51 can be assembled to the base in a variety of ways, for example by snapping together, by bonding or screws. The housing and base define a modular jack member 52, with the contact member 53 of the jack positioned in the base 50, the spring contacts 54 extending up into the aperture 55 of the jack.

The base 50 has three slots formed through its bottom surface, two slots 56 near the back, parallel to the back and in a common axis or plane, and a further slot 57 at right angles to slots 56, positioned between slots 56 and slightly forward thereof. Positioned in the slots 56 are line terminal members, each terminal member having a blade portion 59 which extends through the related slot 56. Also each terminal member has a protector-carrying portion indicated generally at 60. This portion is of a generally U-shape with a bottom leg 61 extending forward from the top end of the blade portion 59, a center leg 62 extending upward from the formed end of leg 61 and a top leg 63 extending rearward from the top end of leg 62, the top leg overlying the bottom leg. The top leg is inclined downward slightly toward the bottom leg. The rear end of the top leg is bent upward slightly out of the plane of the top leg, at 64. Holes 65 and 66 are formed through top and bottom legs 63 and 61 respectively, the holes in alignment, and an insulating sleeve 67 slides over the top leg 63.

A ground terminal assembly is positioned in slot 57. This assembly, in the example, is composed of two terminal members indicated at 70 and 71. The terminal members 70 and 71 are of the same form but are positioned in opposite directions, back-to-back. Each terminal member has a blade portion 72 which extends through the slot 57, the two blade portions in close contact with each other. At the top of each blade portion is a generally U-shaped protector-carrying portion comprising a top leg 73 extending laterally outward from the blade portion, a center leg 74 extending down from the outer end of the top leg, and a bottom leg 75 extending laterally inward from the bottom of the center leg, towards the blade portion but having its inner end stopping a short distance from the blade portion. The bottom leg is inclined upward slightly with the inner end bent down out of the plane of the bottom leg, at 76. A hole 77 is formed in the top leg and a recess 78 is formed in the bottom leg, the recess 78 and hole 77 in alignment.

Figure 10A:
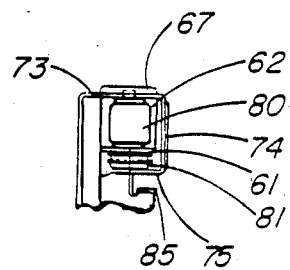
FIG. 10(a) illustrates the assembly of a protector in the module of FIG. 10.

The protector-carrying portions of the ground terminal assembly extend at right angles to the protector-carrying portions 60 of the line terminals. The protector-carrying portions 60 assemble to the protector portions of the ground terminals with leg 63 of the protector-carrying portion 60 over leg 73 and leg 61 over leg 75. A protector 80 is positioned in a protector cradle defined between leg 73 and leg 61 and a back-up protector 81 is positioned in a back-up protector cradle defined between legs 61 and 75. The back-up protector rests in recess 78 and contacts the lower end of protector 78 through hole 66. A protruding member 82 on the protector 80 extends through hole 77 and hole 65. The inclination of legs 63 and 75 requires these legs to the moved away from the opposing legs, for assembly and insertion of the protectors, providing resilient gripping of the protectors. The sleeves 67 provide electrical isolation betwen legs 63 and 73, while legs 61 and 75 are separated by the back-up protector 79. The assembly of the protector 80 and back-up protector 81 in the legs 73 and 61, and legs 61 and 75 is illustrated in FIG. 10(a).

A connection tab 85 extends forward from each blade portion 59. A terminal 86 attached to conductors 87 from the contact member 53 of the jack, attach to the tabs 85. In normal operation there is direct connection between the incoming lines, to which the blade portions 59 of the line terminals are connected, and the customers equipment connected by a plug in the jack member 52, the connection via tabs 85, terminals 86 and conductors 87 and spring contact members 54. In the event of a voltage overload, there is a discharge across a gap between two electrodes in the protectors 80 to ground via ground terminal members 70 and 71. The protectors 80 are of the gas tube type in which two spaced electrodes are sealed in a dielectric housing, the gap at a sub-atmospheric pressure. If the protector vents, i.e. the seal leaks, the breakdown voltage of the gap becomes too high. In this case the back-up protectors 81 provide an alternative breakdown path, at a slightly higher voltage than that of protectors 80 when in working condition. Only one protector 80 may fault, the related back-up protector 81 then taking over. The back-up protector is conveniently of a form which breaks down permanently to a short after a very minimal number of actuations, or at least has a very low breakdown value.

FIG. 10 illustrates a module in which the jack axis is normal to the plug-in axis of the module. For example, the module plugs in with a downward movement and a plug is inserted into the jack with a lateral movement.

Figure 11:
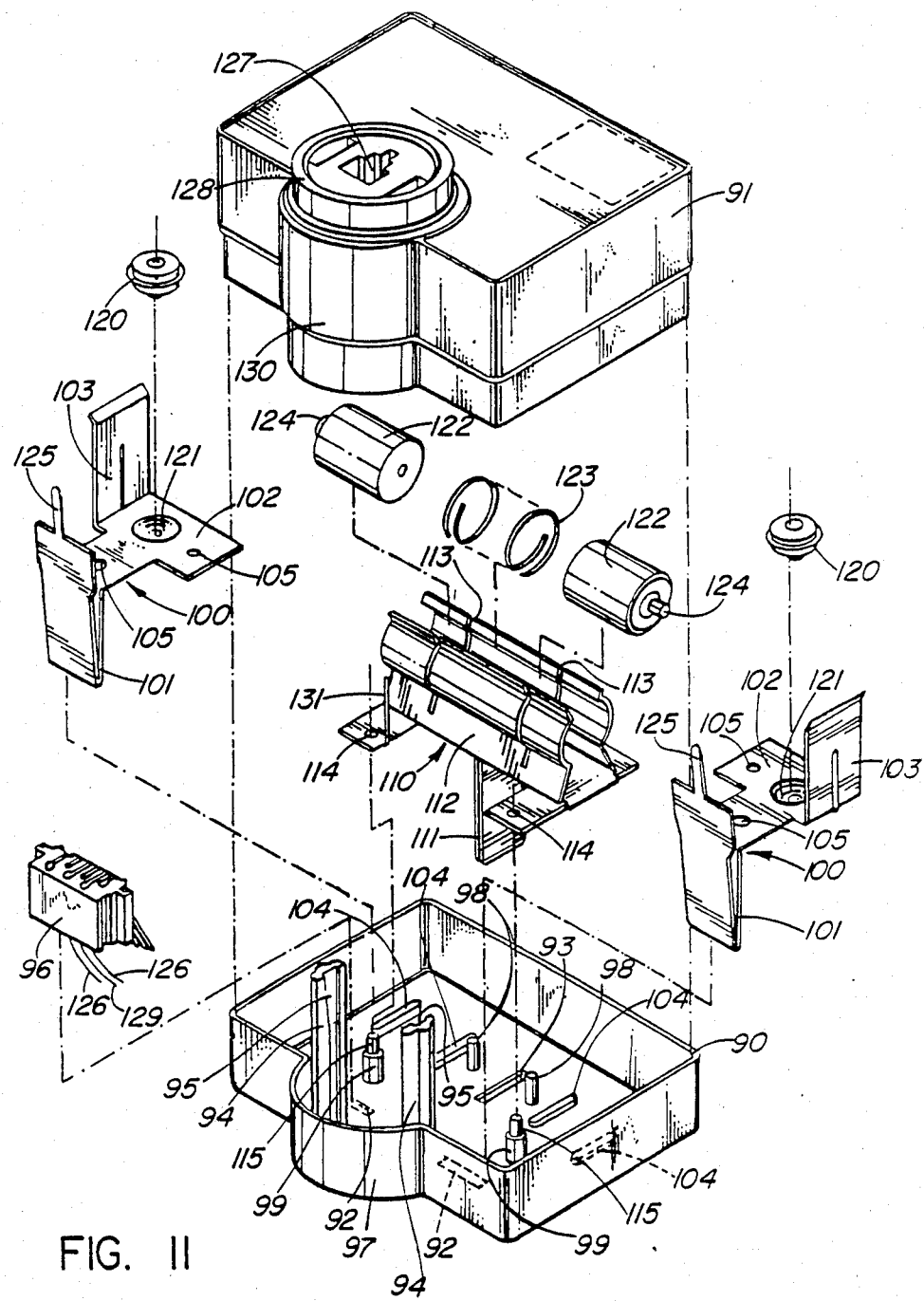
FIG. 11 is an exploded perspective view of another form of plug-in module with line protectors.
Figure 12:
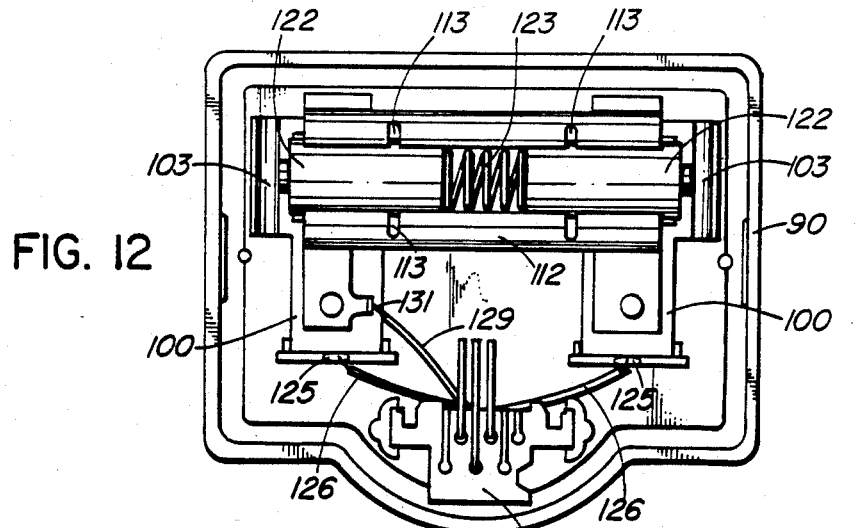
FIG. 12 is a plan view of the module of FIG. 11, with top cover removed, showing the wiring arrangement.

FIGS. 11 and 12 illustrate a module in which the jack axis and the module insertion axis are parallel. The module illustrated in FIGS. 11 and 12 has a base 90 and a top 91 which combine to form an enclosure. In the base are two slots 92 for line terminals and a slot 93 for a ground terminal. Two pillars 94 extend up from the inner bottom surface of the base, the pillars having opposed grooves 95 in which slides a contact member 96 for a modular jack. The base has an arcuate portion 97 at a jack position. Mounting posts 98 and 99 extend up from the bottom surface of the base for mounting and positioning of terminals in the housing.

Two line terminals are indicated at 100. Each line terminal has a blade portion 101 which extends down through a slot 92. At the top of the blade portion an L-shaped portion extends, comprising a support portion 102 extending generally normal to the blade portion, and a contact portion 103 extending normal to the support portion. In position, the support portions 102 rest on ribs 104 on the bottom surface of the base 90, holes 105 allowing passage of the posts 98 and 99. The contact portions are adjacent the ends of the base, with the support portions extending towards each other.

A ground terminal member 110 has a blade portion 111 which extends through slot 93 and a tubular protector holding portion 112 which is divided into three portions by slits 113. In position, the protector holding portion rests on top of the posts 98, and is located by holes 114 which fit over top portions 115 of the posts 99, the portions 115 being of smaller diameter than the lower parts of the posts. This maintains a gap between the portion 112 of the ground terminal member 110 and the line terminals 100.

Positioned between the support portions 102 of the line terminals and the protector holding portion 112 of the ground terminal are back-up protectors 120. The protectors rests in recesses 121 formed in the support portions 102. Positioned in the tubular protector holding portion 112 of the ground terminal 110 are two protectors 122 spaced by a compression spring 123. The outer ends of the protectors 122 have projecting members 124 which make contact with the associated contact portion 103. The casings of the protectors are of conductive material and are in contact with the portion 112 of the ground terminal. Tabs 125 on the line terminals provide for connection of conductors 126 from the contact member 96.

In operation, direct connection exists between the incoming lines, to which the blade portions 101 of the line terminals are connected, and the customers equipment connected by a plug in the jack, via the tabs 125 and conductors 126. On occurrence of an overvoltage, there is a breakdown in one or both protectors 122 to ground. Protectors 122 are generally of the gas tube type with two spaced electrodes sealed in a housing, the gap at sub-atmospheric pressure. If a protector 122 becomes faulty, as by leakage, resulting in an unacceptably high breakdown voltage characteristic, then the back-up protectors 120 will break down at a slightly higher voltage than that a protectors 122 when in operating condition. However, the back-up protectors are of the type which fail to a short or very low breakdown voltage condition after a minimal number of breakdowns.

The top 91 can be attached to the base by any convenient way, for example snapping together or by bonding. The cover has an arcuate portion 130 which matches arcuate portion 97 in the base, and the profiled aperture 127 for a modular plug is formed in a boss 128 extending into the arcuate portion 130. FIG. 12 illustrates the connection of the jack to the terminals, conductors 126 extending from the jack to the line terminals and also a ground connection by a conductor 129 between the jack and the ground terminal, the conductor being connected to a tab 131 on the ground terminal.

Figure 13:
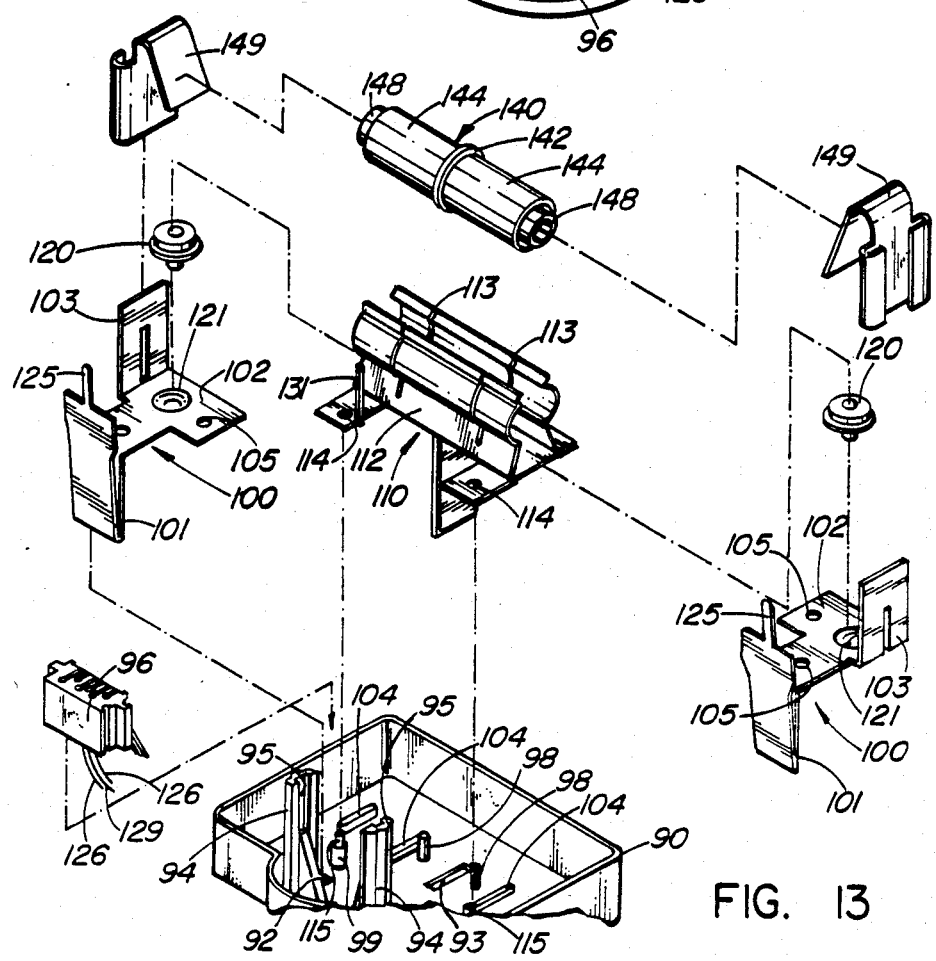
FIG. 13 is an exploded view of a modification to the module of FIG. 11.
Figure 14:
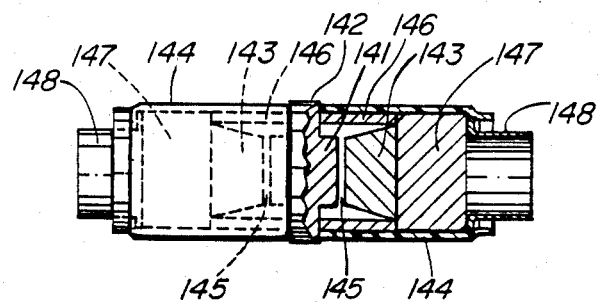
FIG. 14 is a side view, partially in section, of the protector in FIG. 13.
Figure 15:
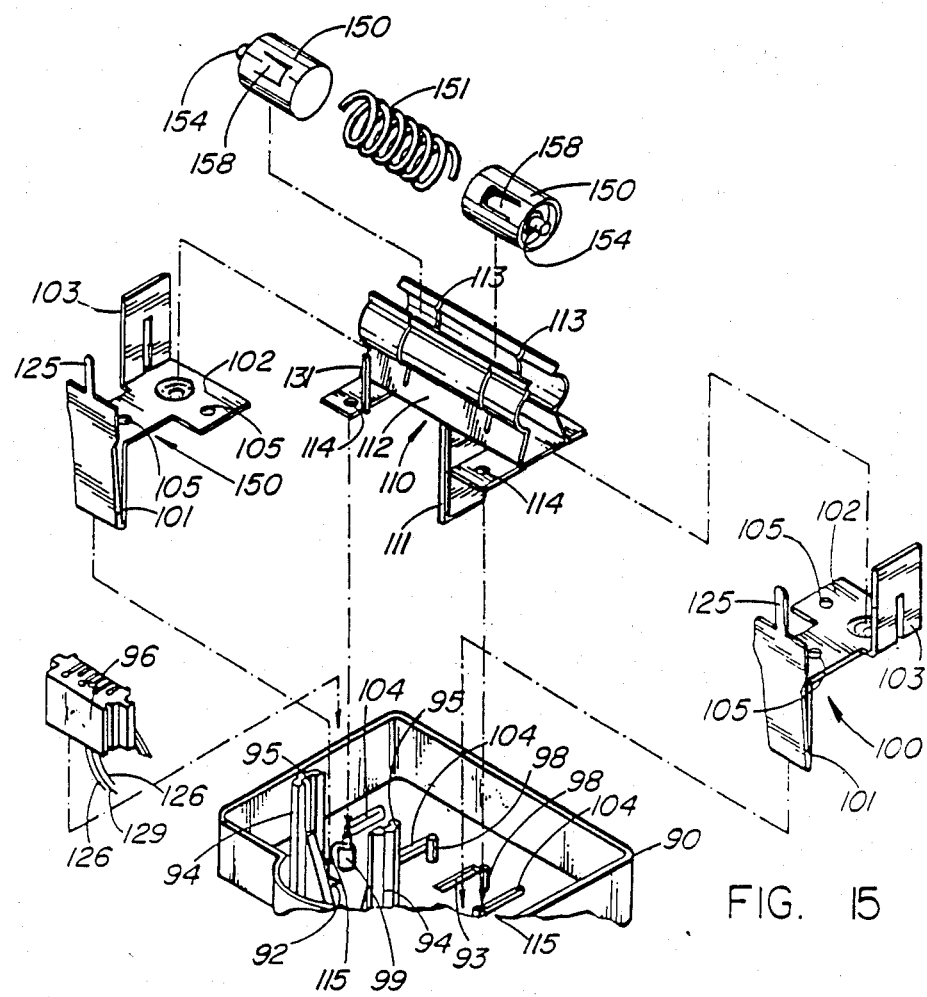
FIG. 15 is an exploded view of another modification to the module of FIG. 11.

FIGS. 13 and 15 illustrate two alternate forms of the module of FIG. 11, using different forms of protector. In both FIG. 13 and in FIG. 15, common reference numerals have been used for details which are common with FIG. 11. In FIG. 13, instead of two separate protectors as at 122 in FIG. 11, a single combined unit comprising a three-electrode gas tube protector 140 is used. The form of this protector is illustrated in FIG. 14 and comprises a central electrode 141 having an annular contact portion 142 projecting radially, and two further electrodes 143, one on each side of the central electrode 141. The electrodes 143 are each spaced a small distance from the central electrode to define arc gaps 145, within ceramic devices 146. This is a conventional form of protector. A dielectric sleeve 144, for example of synthetic resin, projects each end from each end of the protector. Positioned within each sleeve 144 is a fusible element 147. The elements 147 are in contact with the electrodes 143 and 144. On the outer end of each element 147 is a metal electrode 148. Typically electrodes 147 are of copper alloy. As there is no spring 123 as in FIG. 13, spring contact members 149 are pushed on the contact portions 103 of the terminals 100. The spring contact members 149 grip the protector 140 between them. The central annular portion 142 makes contact with the holding portion 112 of the ground terminal member 110.

Figure 16:
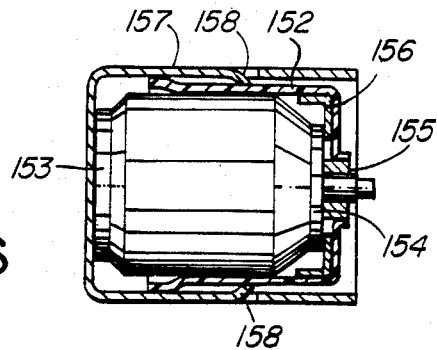
FIG. 16 is a partial sectioned view of a protector as used in FIG. 15.

FIG. 15 illustrates an arrangement in which two separate protectors are used, but each protector, being a gas tube protector, also has a back-up gap feature embodied in it, and therefore separate back-up protectors 120, in FIGS. 11 and 12, are not used. In this example, two protectors 150 are held in the holding portion 112 of the ground terminal member 110, separated by a spring 151. The protectors 150 are gas tube protectors, with the ground terminal member contacting the metal casing of the protector. A protector is seen in more detail in FIG. 16, having a metal casing 152 with a gas tube unit inside, the electrodes at each end indicated at 153 and 154. A fusible element may also be provided in the unit for overcurrent protection. The electrode 154 is isolated from casing 152 by a high dielectric ceramic member 155 and a synthetic resin insulator washer 156 is positioned between the casing 152 of the unit and the electrode 154. The washer provides a back-up gap. The actual form of the protector can vary. An outer casing 157 is positioned over the protector in contact with electrode 153. Tabs 158 ensure contact between the outer casing 157 and the casing 152.

Instead of gas tube protectors, as at 150 in FIG. 15, carbon block protectors, without back-up gap features, may be used. Carbon block protectors are not normally sealed, working at ambient pressure and open to the atmosphere. Some form of fusible element is normally associated with such protectors to provide overcurrent protection.

Figure 17:
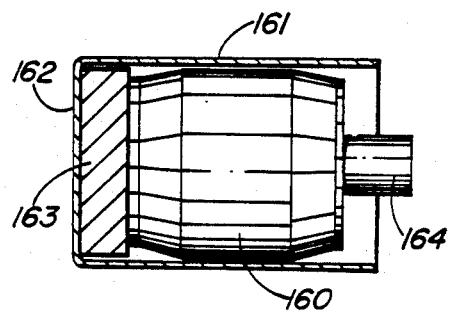
FIGS. 17 and 18 illustrate two forms of protectors as can be used in the module of FIGS. 11 and 14.
Figure 18:
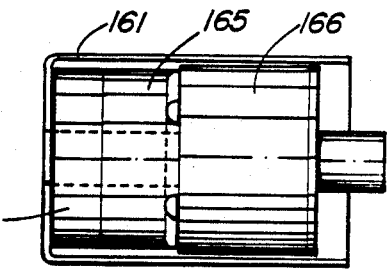

FIGS. 17 and 18 illustrate two alternative forms of protector module which can be used in the module of FIGS. 11 and 15. In FIG. 17, a gas tube protector 160 is housed in a metal cup 161. The cup has a closed end 162 and between the closed end and the protector 160 is a fusible pellet 163. A contact member 164 extends from this open end of the cup. The operation of this device is as follows. Normally the contact member 103 in FIGS. 11 or 15, rests against the contact member 164. This is the situation for both protectors in the module. For voltage overloads such as lightning strikes and the like, operation is as described above. However, for a more continuous overload, such as an overcurrent overload, the protector heats up and eventually the fusible pellet melts. The spring 123 pushes the cup 161 axially until the open end of the cup contacts the contact member 103, producing a short. This can occur for both line terminals.

FIG. 18 illustrates a mesa carbon disc type protector. Opposed carbon blocks 165 and 166 are positioned in the metal cup 161 with a spacer setting a gap between electrodes. A fusible pellet 163 is provided. Again, on a more continuous overload the pellet 163 melts and the cup 161 contacts the contact member 103.

Figure 19:
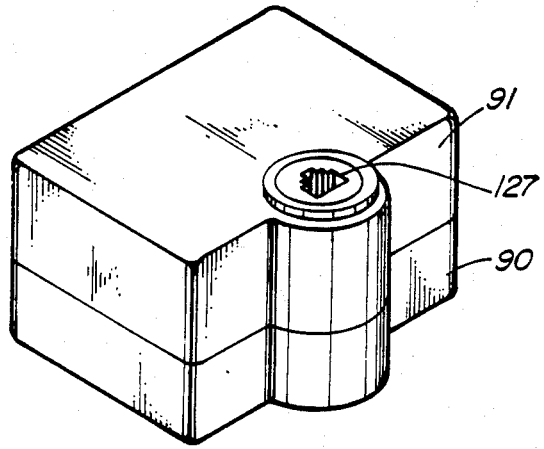
FIG. 19 illustrates an assembled module as detailed in FIG. 11.
Figure 20:
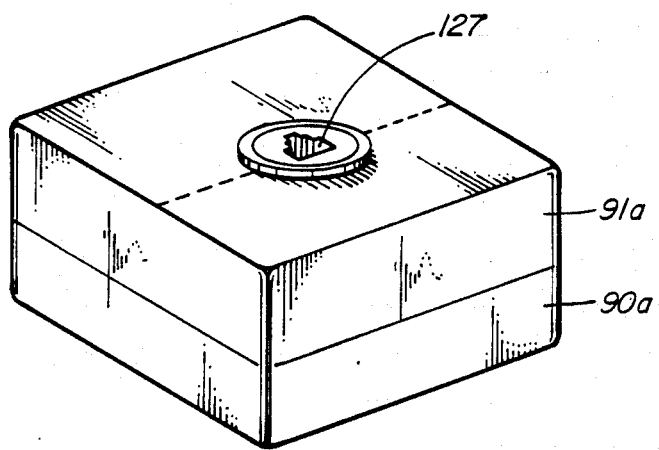
FIG. 20 illustrates a modification of the module of FIG. 19.

FIGS. 19 and 20 illustrate a simple modification to a module for including a service or function, as previously described. FIG. 19 illustrates a module, as in FIG. 11, in assembled form. FIG. 20 illustrates a modified shape for the housing, providing room for electronic circuitry in the module. With modern technology, and VLSI (very large scale integrated) circuits, a small printed circuit board with the associated circuitry and solid state devices can readily be accommodated in the enlarged housing. The housing can still be in two parts, identified at 90(a) and 91(a), and the various items mounted within the module as illustrated in FIG. 11 are also included in the modified module of FIG. 20.

What is claimed is:

1. An interface module for use in telecommunications systems, comprising:
    a base;
    a hollow housing adapted to be attachable to said base, and to define with said base a modular jack member;
    two line terminal slots and one ground terminal slot formed in said base;
    two line terminal members, one line terminal member being positioned in each of said line terminal slots, and each having a blade portion extending through its respective line terminal slot and a U-shaped protector carrying portion;
    a ground terminal assembly positioned in said ground terminal slot, said ground terminal assembly including two ground terminal members having substantially the same form and oriented back-to-back, each of said ground terminal members having a blade portion extending through said ground terminal slot in close contact with the blade portion of the other ground terminal member, and having a U-shaped protector carrying portion;
    said U-shaped protector carrying portions of each of said ground terminal members being adapted to assemble with a respective one of said U-shaped protectors of said line terminal members to define a protector cardle and a back-up protector cradle;
    two protectors, one protector being positioned in each protector cradle; and
    two back-up protectors, one back-up protector being positioned in each back-up protector cradle, each of said protector cradles being arranged so that said protector respectively positioned therein provides a path of low electrical resistance between the line terminal member and ground terminal member defining said each protector cradle when a voltage difference between said line terminal member and said ground terminal member exceeds a first predetermined amount; and
    each of said back-up protector cradles being arranged so that said back-up protector respectively positioned therein provides an alternate path of low electrical resistance between said line terminal member and said ground terminal member defining said each back-up protector cradle when a voltage difference between said line terminal member and said ground terminal member exceeds a second predetermined amount.

2. An interface as claimed in claim 1, said protectors comprising gas tube protectors.

3. An interface as claimed in claim 1, said protectors comprising carbon block protectors.

4. An interface as claimed in claim 1, including means for connection of further services and functions.

5. An interface as claimed in claim 4, said body portion including an electronic circuit for providing a further service.

6. An interface as claimed in claim 5, said further service including one of Automatic Number Identification, Remote Isolating Device, Ring Isolator and Load Simulator.

7. An interface module for use in telecommunications systems, comprising:
    a base;
    a top adapted to combine with said base to form an enclosure;
    means attached to said base for receiving a modular jack;
    two line terminals, one line terminal being positioned in each line terminal slot, each terminal having a blade portion, a support portion, and a contact portion;
    a ground terminal member positioned in said ground terminal having a blade portion and a tubular protector holding portion;
    a pair of protectors positioned mutually opposed within said protector holding portion; and
    a spring positioned within said protector holding portion between said pair of protectors to urge said pair of protectors apart;
    said pair of protectors being further positioned so that an end of each of said pair of protectors not opposed to the other of said pair of protectors is urged into contact by said spring with the contact portion of a respective one of said line terminal members.

8. An interface module as claimed in claim 7, further comprising a pair of back-up protectors respectively positioned between the support portions of said line terminal members and the protector holding portion of said ground terminal member.

9. An interface module as claimed in claim 7, wherein said protectors each comprise:
    a gas tube protector;

a metal cup housing said gas tube protector and having a closed end; and a fusable pellet arranged between said closed end and said gas tube protector, said protector being arranged so that when a continuous overload occurs, said fusable pellet melts, and said spring causes said cup to move laterally with respect to said gas tube protector causing a short around said gas tube protector.

10. An interface module as claimed in claim 7, wherein said protectors each comprise:

two carbon blocks having opposed inner ends;

a fusable pellet positioned between said opposed inner ends of said carbon blocks; and a metal cup housing said carbon blocks and having a closed end abutting an outer end of one of said carbon blocks, said protector being arranged so that when a continuous overload occurs, said fusable pellet melts, and said spring causes said cup to move laterally with respect to said carbon blocks causing a short around said carbon blocks.

11. An interface module for use in telecommunications systems comprising:

a base;

a top adapted to combine with said base to form an enclosure;

tow long, thin line terminal slots and one long, thin ground terminal slot formed in said base;

means attached to said base and integral with said enclosure for receiving a modular jack;

a first and second terminal, a terminal being positioned in each line terminal slot, each terminal having a wide, thin blade portion, a support portion, and a contact portion;

a third terminal positioned in said ground terminal slot and having a wide, thin blade portion and a tubular protector holding portion; and a protector positioned in said protector holding portion.

12. An interface as claimed in claim 11, said protectors comprising a three-electrode gas tube protector element, comprising a central electrode and spaced outer electrodes, said outer electrodes connection at outer ends respectively to said first and second terminals and said central electrode connecting to said third terminal.

* * * * *